United States Patent
Hosokawa et al.

(10) Patent No.: US 8,259,894 B2
(45) Date of Patent: Sep. 4, 2012

(54) METHOD OF SUPPRESSING DEPOSITION OF RADIOACTIVE ISOTOPE

(75) Inventors: Hideyuki Hosokawa, Hitachinaka (JP); Makoto Nagase, Mito (JP); Satoshi Morisawa, Hitachi (JP); Motoaki Sakashita, Hitachi (JP); Katsuo Yokota, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 536 days.

(21) Appl. No.: 11/768,437

(22) Filed: Jun. 26, 2007

(65) Prior Publication Data

US 2008/0181351 A1 Jul. 31, 2008

(30) Foreign Application Priority Data

Dec. 14, 2006 (JP) ................................ 2006-337012

(51) Int. Cl.
*G21C 9/00* (2006.01)

(52) U.S. Cl. ....................................... 376/305; 376/306
(58) Field of Classification Search .................. 376/305, 376/306

See application file for complete search history.

(56) References Cited

U.S. PATENT DOCUMENTS

| | | | | |
|---|---|---|---|---|
| 2004/0235652 A1* | 11/2004 | Smith et al. | .................... | 502/304 |
| 2009/0290675 A1 | 11/2009 | Hosokawa et al. | | |

FOREIGN PATENT DOCUMENTS

| | | |
|---|---|---|
| JP | 58-79196 | 5/1983 |
| JP | 62-95498 | 5/1987 |
| JP | 2006-038483 | 2/2006 |
| JP | 2007-024644 | 2/2007 |

* cited by examiner

*Primary Examiner* — Ricardo Palabrica
(74) *Attorney, Agent, or Firm* — Mattingly & Malur, PC

(57) ABSTRACT

A formic acid aqueous solution that contains Fe (II) ions is produced by dissolving metal iron in a formic acid aqueous solution. Nitrogen is supplied from a nitrogen supply device to a chemical liquid tank and then discharged from a discharge line to reduce the dissolved oxygen concentration in the aqueous solution. The chemical liquid tank is filled with the formic acid aqueous solution sealed with nitrogen, and transferred from a factory to a nuclear reactor building designated as radiation-controlled areas. Inside the nuclear reactor building, the chemical liquid tank is installed in a film deposition apparatus connected to a reactor water recirculation pipeline. The formic acid aqueous is supplied from the chemical liquid tank to the inside of the reactor water recirculation pipeline, and then a ferrite film is formed on the inner surface of the reactor water recirculation pipeline.

7 Claims, 10 Drawing Sheets

METHOD OF SUPPRESSING DEPOSITION OF RADIOACTIVE ISOTOPE

BACKGROUND OF THE INVENTION

1. Field of the Invention

The present invention relates generally to methods of suppressing deposition of a radioactive isotope, and more particularly to a method of suppressing deposition of a radioactive isotope, which is suitable for application to formation of a ferrite film on a constituent element surface of a boiling-water reactor power plant.

2. Description of the Related Art

Boiling-water reactor (BWR) power plants, for example, are constructed so that fuel-generated heat is efficiently moved to cooling water by forcibly circulating via a recirculating pump or an internal pump the cooling water to a reactor pressure vessel that contains fuel rods. A large portion of the steam which has thus been generated by boiling of the cooling water in the reactor is used to drive a steam turbine to which a power generator is coupled. The steam, after being discharged from the steam turbine, is condensed by a condenser. The condensate that has been obtained by the condensation of the steam is almost completely deaerated within the condenser and supplied as cooling water for the reactor once again. At this time, the oxygen and hydrogen that have resulted from the radiolysis of water inside the reactor are also almost completely removed from the condensate within the condenser. The condensate, before being returned to the reactor, is cleared mainly of metallic impurities by a desalter and/or other ion-exchange resin filtering devices in order to suppress the occurrence of radioactive corrosion products in the reactor. After that, the condensate is heated to approximately 200 degrees C. and supplied to the reactor.

Radioactive corrosion products also occur in the pressure vessel and other sections brought into contact with the reactor water, such as a PLR (Primary Loop of Recirculation) system. Steel essentially free from corrosion, such as stainless steel or a nickel-based alloy, is therefore used to form the main constituent members of a primary system. Also, reactor pressure vessels made of low-alloy steel have the respective inner surfaces padded with stainless steel to prevent the low-alloy steel from coming into direct contact with the reactor water. In addition to these considerations associated with materials, a reactor water clean-up system is used to clean a portion of the reactor water and actively remove the metallic impurities slightly generated in the water.

However, even with the above-discussed anti-corrosion measures, the presence of very small quantities of metallic impurities in the reactor water are unavoidable, so some of the metallic impurities become deposited as metal oxides on the surfaces of the fuel rods. When irradiated with the neutrons emitted from the nuclear fuel inside the fuel rods, the metals that have deposited on the fuel rod surfaces cause a nuclear reaction and generate cobalt-60, cobalt-58, chromium-51, manganese-54, or other radioactive isotopes. Most of the radioactive isotopes remain deposited in the form of oxides on the fuel rod surfaces. Some of the radioactive isotopes, however, are eluted into the cooling water, or re-released as insoluble solid precipitates into the reactor water, in accordance with the solubility of the oxide within the isotope. The radioactive substances in the reactor water are removed by the reactor water clean-up system. While being circulated with the reactor water through the PLR system, unremoved radioactive substances accumulate on the surfaces of the constituent members. As a result, radiation is emitted from the surfaces of the constituent members, thus causing radiation exposure of the persons engaged in routine inspection. The inspection staff's radiation doses are controlled so as not to exceed defined values for each person. Under the situation of these defined values being lowered in recent years, the necessity is arising for reduction of each person's radiation dose to a level as low as economically achievable.

Accordingly, methods of reducing the deposition of radioactive isotopes on pipelines, and methods of reducing the density of the radioactive isotope in reactor water are being studied in various terms. JP-A-58-79196, for example, proposes a method of suppressing the ingress of a radioactive isotope such as cobalt-60 or cobalt-58 into an oxide film by injecting zinc or other metal ions into the reactor water and forming a zinc-containing fine oxide film on the surface of the PLR system piping brought into contact with the reactor water. Also, JP-A-62-95498, for example, proposes a method in which, before the radioactive isotope is eluted or released into the cooling water, an oxide film is formed under fixed conditions beforehand on the inner surfaces of the PLR system and reactor water clean-up system pipelines into which the reactor water flows during operation.

For the method of injecting zinc or other metal ions into the reactor water, which is described in JP-A-58-79196, depleted high-valence zinc ions must be continuously injected during operation to avoid radioactivation of the zinc itself. Also, for the method of forming an oxide film, which is described in JP-A-62-95498, there is a need to form the oxide film in, for example, a range of the operating temperature of 250-300 degrees C. of the BWR power plant.

Accordingly, a technique for forming a fine ferrite film on a material surface at a low temperature equal to or less than 100 degrees C. has been studied as a less expensive method of reducing the deposition rate of a radioactive isotope. Experiments with test pieces having a ferrite film formed on a metal surface have been conducted to find that, as shown in FIG. 2, the deposition of a radioactive isotope under a reactor water environment can be suppressed significantly.

SUMMARY OF THE INVENTION

To form a ferrite film on a section where the deposition of a radioactive isotope is to be suppressed, it is necessary to adjust the concentrations of Fe (II) ions and Fe (III) ions to a range from pH 5.5 to 9.0 while controlling the concentration ratio between the two kinds of ions. Superfluous oxidation of the Fe (II) ions due to the oxygen contained in the atmosphere needs to be suppressed for that purpose. FIG. 3 shows comparison results on the amount of ferrite film formed with a reactant kept free from contact with the oxygen in the atmosphere, and on the amount of ferrite film formed in a system exposed to the atmosphere. For waste materials volume reduction, it is preferable that the counter-ions to the Fe (Ii) ions be those which can be decomposed into a gas or water at room temperature.

The present invention has been made with the above taken into account, and a first object of the invention is to provide a method of suppressing deposition of a radioactive isotope, the method making it possible to improve safety and to prevent unpredicted extension of an operation shutdown period of a nuclear power plant.

A second object of the present invention is to prepare a chemical that contains Fe (II) ions necessary for formation of a ferrite film on a metallic member, while preventing the Fe (II) ions from being oxidized into Fe (III) ions so as to make a ferritizing reaction controllable, store the chemical until it is used, transport the chemical to a usage place, and use the chemical. Additionally, ions that can be decomposed into a gas or water at room temperature are supplied as counter-ions with respect to the Fe (Ii) ions.

In order to fulfill the above first object, the present invention is characterized in that: after a first chemical container filled with a first chemical which contains ferrous (II) ions has been carried from a non-radiation-controlled area into a radiation-controlled area having a nuclear power plant installed therein, the first chemical container is connected to a film-forming apparatus which has a second chemical container to be filled with a second chemical for oxidizing the ferrous (II) ions into ferric (III) ions, and a third chemical container to be filled with a pH-adjusting third chemical and existing in the radiation-controlled area; a processing liquid, which contains the first, second, and third chemicals in a mixed form, is brought into contact with the surface of a structural member of the nuclear power plant where a coolant for use in the power plant comes into contact; and a ferrite film is formed on the surface of the structural member.

In the present invention, since, after being carried from a non-radiation-controlled area into the radiation-controlled area having the nuclear power plant installed therein, the first chemical container filled with the first chemical which contains generated ferrous (II) ions is connected to the film-forming apparatus existing in the radiation-controlled area, the radiation-controlled area is kept free from the occurrence of hydrogen, associated with production of the first chemical. Accordingly, a fire or explosion based on the hydrogen cannot occur in the radiation-controlled area and it is possible to prevent unpredicted extension of an operation shutdown period of the nuclear power plant due to such accidents. Additionally, in the present invention, the processing liquid, which contains, in a mixed form, the first chemical from the first chemical container connected to the film-forming apparatus, the second chemical from the second chemical container provided in the film-forming apparatus, and the third chemical from the third chemical container, can be used to form a ferrite film on the surface of the structural member of the nuclear power plant where the coolant comes into contact. Deposition of radioactive isotopes on the surface of the structural member can therefore be suppressed.

The above second object can be fulfilled by, when the processing liquid which contains, in a mixed form, the first chemical containing the ferrous (II) ions, the second chemical that oxidizes part of the ferrous (II) ions into the ferric (III) ions, and the third chemical that adjusts, to a range from 5.5 to 9.0, a pH value of the processing liquid obtained by mixing the first and second chemicals, is used to form a ferrite film on the surface of a metallic section: applying a method of preparing, storing, transporting, and using the chemicals intended to form the ferrite film, the method further including the steps of storing an acidic aqueous solution into a container for preparing the first chemical, heating the aqueous solution, preparing a dissolving liquid by adding iron to the aqueous solution after dissolved oxygen has been removed therefrom during the heating operation, and isolating the dissolving liquid so as to keep this liquid away from oxygen.

Using this method makes it possible to obtain the advantageous effect that the chemical containing the Fe (II) ions needed to form the ferrite film can be conditioned while preventing production of Fe (III) that inhibits control of the formation of the ferrite film. The above method also makes it possible to reduce radioactive waste.

According to the present invention, it is possible to improve safety and to prevent unpredicted extension of an operation shutdown period of a nuclear power plant.

DETAILED DESCRIPTION OF THE PREFERRED EMBODIMENTS

Figure 1:
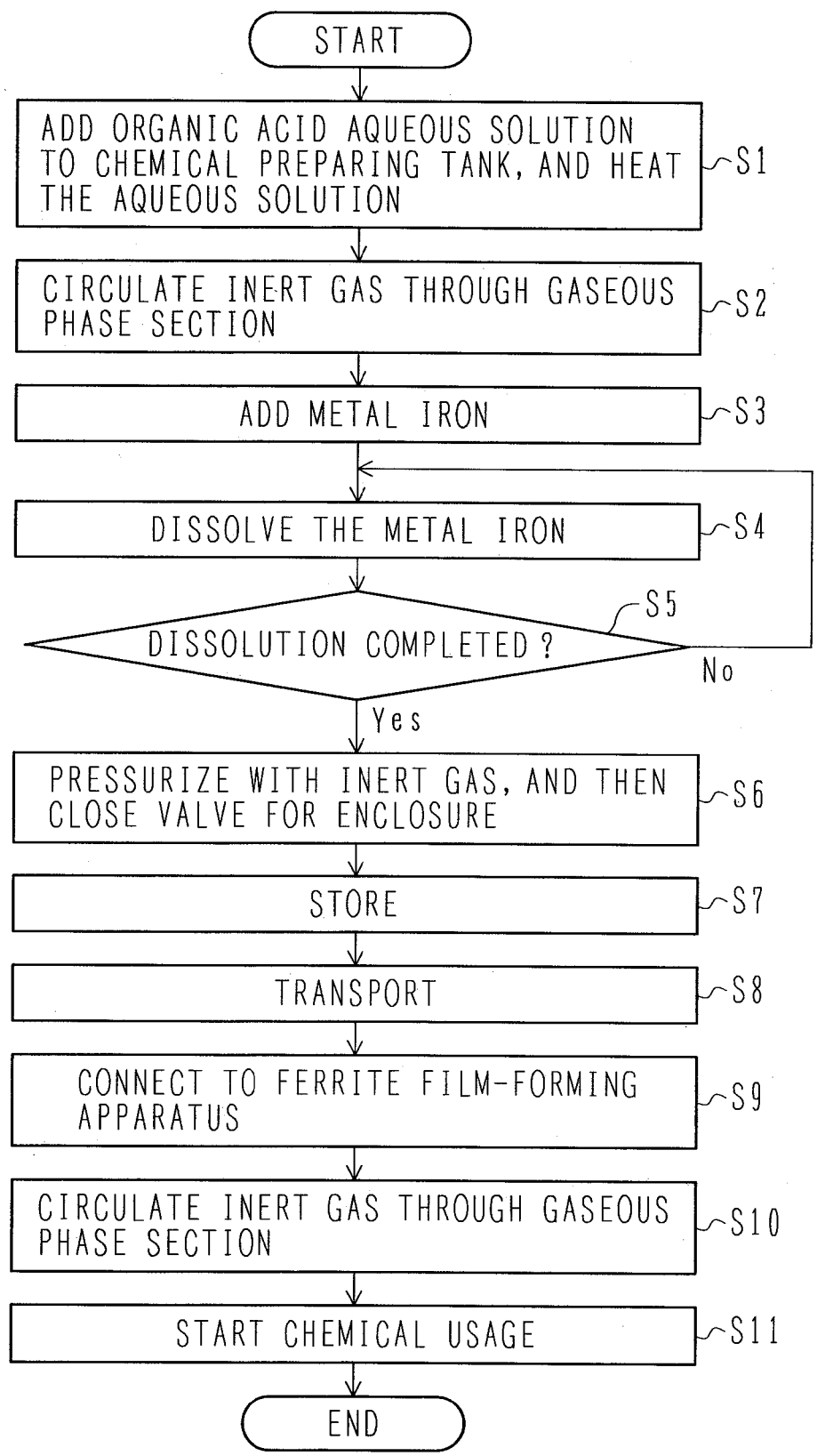
FIG. 1 is a flowchart showing a procedure for implementing a method of preparing, storing, transporting, and using a chemical to form a ferrite film according to a first embodiment which is a preferred embodiment of the present invention.
Figure 2:
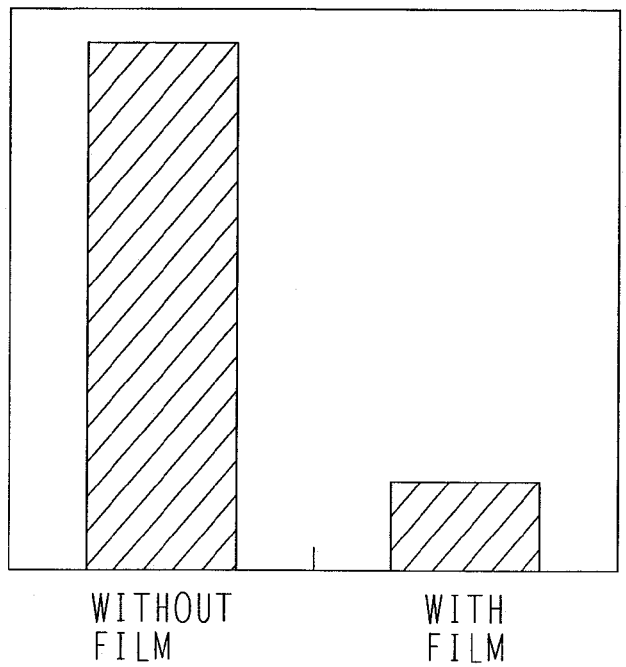
FIG. 2 is a diagram that shows experimental results on deposition levels of Co-60, obtained by immersing test pieces having a magnetite-based ferrite film formed on a stainless steel surface, and test pieces without such a ferrite film, in hot water under BWR service operating conditions.
Figure 3:
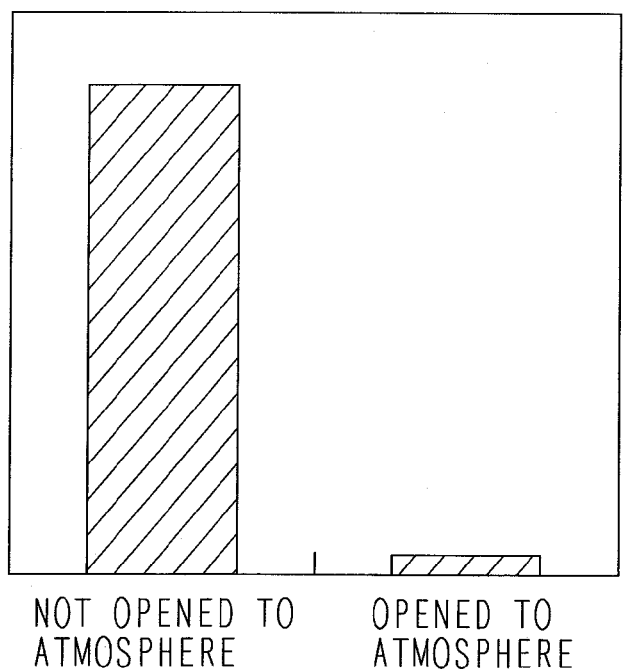
FIG. 3 is a diagram which shows impacts in the cases where the test pieces are exposed to and are not exposed to atmospheric pressure upon formation of the magnetite-based ferrite film on the respective stainless steel surfaces.

When a salt that contains Fe (II) is dissolved in water, Fe (III) will be produced since the water will be affected by dissolved oxygen and cause a reaction represented by equation (1).

$$4Fe^{2+}+O_2+2H_2O \rightarrow 4Fe^{3+}+4OH^- \qquad (1)$$

To suppress this reaction, the dissolved oxygen in the water solution must be removed. Methods of removing the dissolved oxygen include a method of reducing oxygen solubility by boiling the water solution, or a method of substituting the dissolved oxygen for nitrogen, argon, carbon dioxide, or any other gas inert for the oxidation of the Fe (II) ions, by bubbling the gas. These methods, however, do not suffice to suppress the oxidation of the Fe (II) ions at a gas-liquid interface due to the presence of oxygen in the atmosphere. In addition to these methods, therefore, a gaseous phase section in contact with the water solution needs to be covered with nitrogen, argon, carbon dioxide, or any other gas inert to the oxidation of the Fe (II) ions.

The reaction represented by equation (1) occurs if the Fe (II) ions are dissolved in the water. When oxygen is present, therefore, the reaction occurs not only when the salt that contains Fe (II) is dissolved in the water, but also when the water solution obtained after the salt has been dissolved is stored, transported, and used. This makes it necessary to prevent the water solution from coming into contact with the oxygen in the atmosphere, even during storage, transport, and use of the water solution, and conduct sealing with nitrogen, argon, carbon dioxide, or any other gas inert to the oxidation of the Fe (II) ions, or maintain a circulation state of the inert gas.

When nitrogen, argon, carbon dioxide, or any other gas inert to the oxidation of the Fe (II) ions is bubbled for removing the dissolved oxygen from the water solution, contact with oxygen is considered to be preventable if the bubbling of the gas is continued during subsequent storage, transport, and use. According to experiments by the present inventors, the moment the air bubbles leave the bubbling section, a wall surface of the bubbling section is wetted for a moment with the water solution of the salt which contains Fe (II), and when the bubbles grow once again, drying at the gas-liquid interface occurs to enrich the salt that contains Fe (II). If this process is repeated, the salt will be enriched to solubility exceeding that of the salt which contains Fe (II). The salt that contains Fe (II) will consequently precipitate. The precipitation of the salt will stop inflow of the inert gas and permit oxygen to enter from the atmosphere. It has therefore been found to be preferable that after nitrogen, argon, carbon dioxide, or any other gas inert for the oxidation of the Fe (II) ions has been bubbled in order to remove the dissolved oxygen from the water solution, the gas be circulated with its spout port taken out to the gaseous phase section following completion of the dissolution of the Fe (II) ions.

Provided that the counter-ions to the Fe (II) ions are intended only to form the ferrite film, the kind of counter-ions to be supplied is not limited and may be, for example, chlorine ions or sulfuric acid ions. In these cases, inorganic salt of Fe (II) can be used. For use in a primary cooling water system of the nuclear power plant, however, since a used substance must be processed as radioactive waste, it is preferable that the counter-ions be decomposable into a gas or water. Examples of a usable substance include carboxylic acid decomposable into carbon dioxide and water by oxidative decomposition. Decomposition of dicarboxylic acid such as the oxalic acid used in chemical decontamination, however, forms Fe (II) and complex salt, thus reducing the solubility of the Fe (II) ions. For this reason, monocarboxylic acid that does not easily form complex salt is preferable. It has been found that in consideration of decomposability, the carbon chain produced should be as short as possible, and thus that using formic acid is most preferred.

Carboxylic acid and the salt of Fe (II) may not be commercially available. If this is the case, using a dissolving liquid resulting from dissolving the iron of metal in an aqueous solution of carboxylic acid is conceivable, in which case, it is necessary to remove dissolved oxygen using such method as described above, and then further isolate the dissolving liquid from the oxygen contained in the atmosphere.

An aqueous solution of an Fe (II) chemical based on carboxylic acid can be taken out as a carboxylate of Fe (II) by removing the water by means of distillation under reduced pressure, and then the carboxylate can be stored and transported. During the distillation under reduced pressure, an inert gas is made to flow into the distillation container so that oxygen does not flow into the solution. Also, the carboxylate of Fe (II) that has precipitated is stored and transported using a hermetically enclosed container in order to avoid contact with the oxygen contained in the atmosphere. When the carboxylate is to be used as the processing liquid for forming a ferrite film, the carboxylate is carried to its usage place, at which the carboxylate is then dissolved in water from which the dissolved oxygen inside has been removed beforehand. After the dissolution, the carboxylate is used such that it does not come into contact with oxygen.

One of the methods that the present inventors have devised for preparing, storing, transporting, and using a processing liquid to form a ferrite film, includes: placing an acidic aqueous solution in a hermetically enclosed container provided with an introduction port and discharge port for a gas and with a introduction port for a chemical, the container having a valve at each of the ports; circulating at least one kind of inert gases selected from a group consisting of nitrogen, carbon dioxide, and argon, through a gaseous phase section of the container; removing dissolved oxygen from the aqueous solution by heating the aqueous solution while preventing contact between oxygen and the aqueous solution; next preparing the chemical by adding iron and dissolving the iron; after the dissolution of the iron, either closing the valves at the gas introduction port and discharge port under a pressurized state where pressure higher than atmospheric pressure is maintained using the inert gas(es) being circulated, or maintaining the circulation state of the inert gas(es); after storage of the chemical into the container and transport of this container to a usage place, installing the container at the usage place; and before using the chemical at the usage place, recirculating the gas(es) through the gas introduction port and discharge port and then connecting a discharge port for the chemical to a pipeline which leads to a desired section on which a ferrite film is to be formed.

Using this method makes it possible to obtain the advantageous effect that the chemical containing the Fe (II) ions needed to form the ferrite film can be conditioned while preventing production of Fe (III) that inhibits control of the formation of the ferrite film. The method also makes it possible to reduce radioactive waste.

First Embodiment

An embodiment of a method of preparing, storing, transporting, and using a chemical to form a ferrite film, will be described below using FIGS. 1, 4, 5, and 6.

Figure 4:
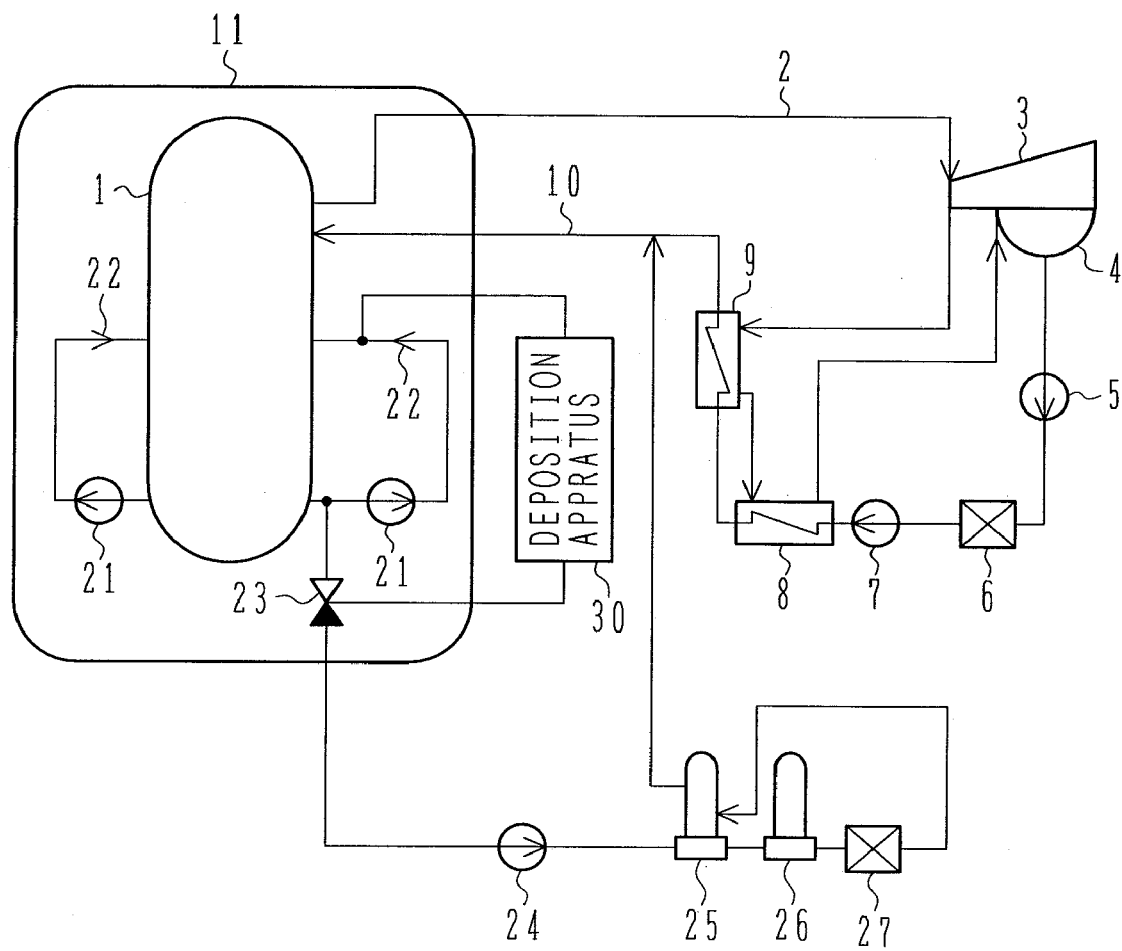
FIG. 4 is a system block diagram of a nuclear power plant having a recirculation pipeline to form the magnetite-based ferrite film.

As shown in FIG. 4, a nuclear reactor power plant includes a reactor pressure vessel 1 that accommodates fuel rods, a main steam pipeline 2 coupled to the pressure vessel 1, a steam turbine 3 coupled to the main steam pipeline 2, a condenser 4 coupled to a steam discharge port of the steam turbine 3, and a power generator coupled to the steam turbine 3. A condensate that has been generated by condensation with the condenser 4 is boosted up by a condensate pump 5 and then returned as supply water to the pressure vessel 1 through a supply water pipeline 10. The supply water pipeline 10 includes a condensate clean-up device 6, a supply water pump 7, a low-pressure supply water heater 8, and a high-pressure water heater 9, and these constituent elements of the pipeline 10 are arranged in that order on a return pathway for the condensate. Steam extraction from the steam turbine 3 is used as heat sources for the low-pressure supply water heater 8 and the high-pressure water heater 9.

The power plant also includes a plurality of reactor water recirculation systems to circulate cooling water through the pressure vessel 1. Each reactor water recirculation system is constructed so that reactor water that has been extracted by a plurality of recirculating pumps 21 coupled to a bottom section of the pressure vessel 1 is recycled back to an upper section thereof via an independent reactor water recirculation pipeline 22 coupled to each recirculating pump 21. A reactor water clean-up system that cleans up the cooling water for the pressure vessel 1 is constructed to cool, through a regenerative heat exchanger 25 and a non-regenerative heat exchanger 26, the reactor water that has been extracted by a clean-up system pump 24 coupled to the reactor water recirculation pipeline 22, then activate a reactor water clean-up device 27 to clean the cooled reactor water, and after heating the cleaned reactor water by means of the regenerative heat exchanger 25, introduce the heated reactor water downstream with respect to the high-pressure water heater 9 on the supply water pipeline 10. The reactor water that has been heated by the regenerative heat exchanger 25 is supplied to the pressure vessel 1 via the supply water pipeline 10.

FIG. 4 shows a case in which a ferrite film constructed mainly of magnetite is to be formed on an inner surface of the reactor water recirculation pipeline 22 of the reactor water recirculation system. A chemical liquid conditioning device (see FIG. 6) that is provided in a usage place of the chemical for forming the ferrite film after the chemical has been prepared, stored, and transported using the preparation, storage, and transport method according to the present embodiment is installed to construct a film deposition apparatus 30 (see FIG. 5). The film deposition apparatus 30 is coupled to the reactor water recirculation system by temporary piping. When service operation of the pressure vessel 1 is stopped, an inflow pathway to the film deposition apparatus 30 is formed by, for example, opening a hood of a valve 23 on a reactor water clean-up pipeline branched from the reactor water recirculation pipeline 22, then shutting off the reactor water clean-up device 27, and coupling a temporary pipeline using a flange of the valve 23. Meanwhile, an outflow pathway from the film deposition apparatus 30 is formed by disconnecting a drain pipe, instrumentation pipe, and other elements located downstream with respect to the recirculating pump 21, and connecting a temporary pipeline to the disconnection-generated branch piping so that a processing liquid can be circulated.

Figure 5:
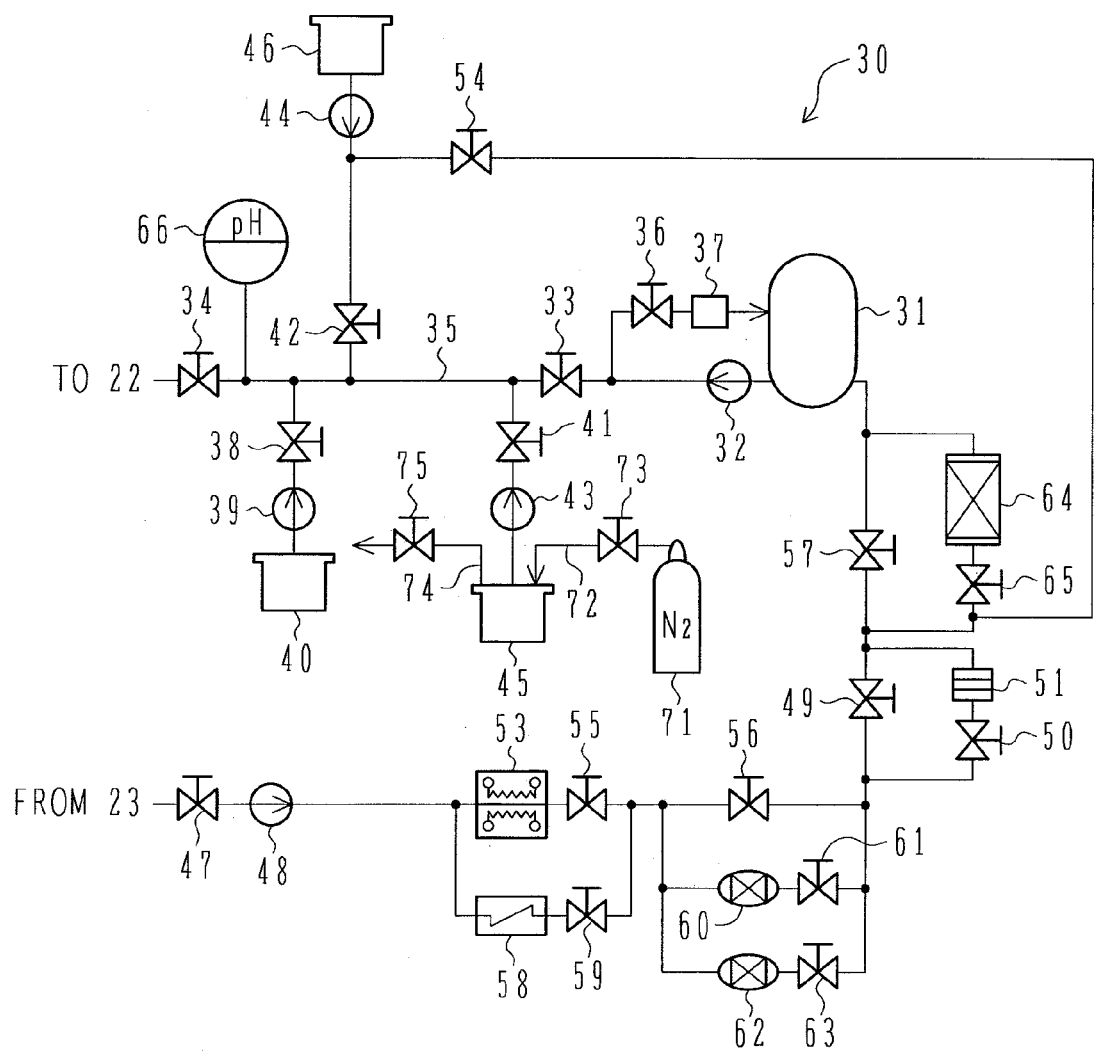
FIG. 5 is a detailed system diagram of a film deposition apparatus connected to the recirculation pipeline of the nuclear power plant of FIG. 4 to form the ferrite film.

In order to be applicable to chemical decontamination, the ferrite film-forming apparatus (film deposition apparatus) 30 shown in FIG. 5 includes a surge tank 31 with which processing water is to be filled, and a circulating pump 32 that extracts the water from the surge tank 31 and supplies the water to one end of the reactor water recirculation pipeline 22 through valves 33, 34. A chemical liquid tank 40 used for chemical decontamination is coupled through a valve 38 and an injection pump 39, to a processing liquid pipeline 35 that connects the valves 33, 34, and hydrazine for pH conditioning is stored in the chemical liquid tank 40. Also, a flow pathway for a return from a discharge port of the circulating pump 32 through a valve 36 and an ejector 37 to the surge tank 31 is formed, and the ejector 37 has a hopper to supply permanganic acid for oxidative dissolving of contaminants within the pipeline, or to supply oxalic acid for reductive dissolving of the contaminants within the pipeline. In addition, chemical liquid tanks 45, 46 used to produce the ferrite film are coupled to the processing liquid pipeline 35 via valves 41, 42 and injection pumps 43, 44.

FIG. 5 shows the chemical liquid tank 45 existing when the chemical that contains Fe (II) ions is being used following completion of preparation, storage, and transport. A valve 73 connecting from a nitrogen supply device 71 to a nitrogen supply line 72 is opened to introduce nitrogen into the chemical liquid tank 45, and a valve 75 on a nitrogen discharge line 74 is opened to discharge the nitrogen. Oxygen contained in the atmosphere is thus prevented from flowing into the chemical liquid tank 45. In addition, inside the chemical liquid tank 46, hydrogen peroxide is stored as an oxidizer for use in producing the ferrite film. Inside the chemical liquid tank 40, hydrazine is stored as a pH conditioner necessary to produce the ferrite film.

The processing liquid that has been supplied to one end of the reactor water recirculation pipeline 22 by the circulating pump 32 is returned from the other end of the reactor water recirculation pipeline 22 through the pipeline 22 to a valve 47. The processing liquid from the valve 47 is passed through a heater 53 and valves 55, 56, 49, 57, in that order, and returned to the surge tank 31, by a circulating pump 48. A flow pathway through a cooler 58 and a valve 59 is coupled in parallel to a flow pathway of the heater 53 and the valve 55. A flow pathway through a cation exchange resin tower 60 and a valve 61, and a flow pathway through a mixed-bed resin tower 62 and a valve 63, are coupled in parallel to each other at the valve 56. A flow pathway through a valve 50 and a filter 51 is connected in parallel to the valve 49. A flow pathway through a valve 65 and a decomposing device 64 is connected in parallel to the valve 57. The hydrogen peroxide stored within the chemical liquid tank 46 can be injected into the decomposing device 64 through a pipeline connected via a valve 54 to a discharge port of the injection pump 44 connected to the chemical liquid tank 46. In the present embodiment, the hydrogen peroxide is used as the oxidizer required for ferrite plating, and as that required for decomposition, so although the chemical liquid tank and injection pump on one pipeline are shared, the two constituent elements may be installed via separate pipelines, if the connection pipeline is too long for the particular location of installation.

A position of the valve 42 for injecting the oxidizer is set to be downstream with respect to the valve 41 for injecting the Fe (II) ions, and upstream with respect to the valve 38 for injecting the pH-conditioning chemical. Also, a position of the valve 38 for injecting the pH-conditioning chemical is preferably set since pH conditioning becomes a parameter for a start of a reaction, the position is not merely downstream with respect to the valve 42 for injecting the oxidizer, but also as close as possible to a region that is to undergo processing. In addition, during ferrite plating, water can be preferably circulated through the filter 51 located downstream with respect to the circulating pump 48. Furthermore, the nitrogen, argon, or any other inert gases in the surge tank 31 are preferably bubbled to remove oxygen from an aqueous solution. Besides, the decomposing device 64 is adapted to decompose an organic acid used as counter-anions to the Fe (II) ions, and the hydrazine used as the pH conditioner. In order to allow for waste materials volume reduction, the present embodiment uses, as the counter-anions to the Fe (II) ions, carbonic acid that can be released as an organic acid or gas decomposable into water and/or carbon dioxide and minimizing a waste materials volume.

Figure 6:
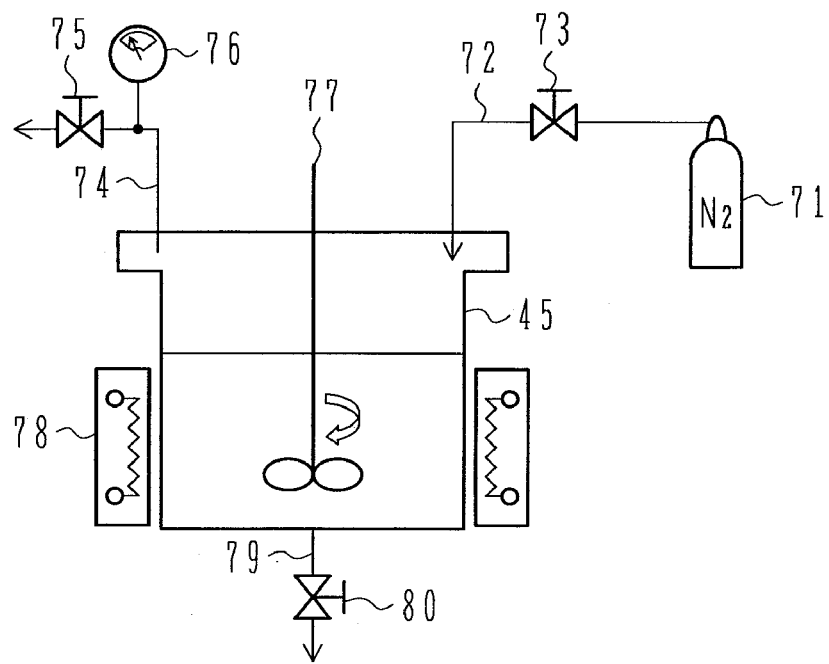
FIG. 6 is a block diagram of a chemical liquid conditioning device and nitrogen supply device used in the first embodiment of the present invention.

Next, the first embodiment of the method of preparing, storing, transporting, and using the chemical to form the ferrite film is described below in accordance with the flowchart shown in FIG. 1. The hermetically enclosable, chemical liquid tank 45 including such inert gas introduction line 72, discharge line 74, and ferrite film-forming chemical introduction port 79 as shown in FIG. 6 is used in implementing the method of the present embodiment.

First, a formic acid aqueous solution is added in the chemical liquid tank 45 and heated by a heater 78 (step S1). Next, the nitrogen from the nitrogen supply device 71 is introduced into the chemical liquid tank 45 by opening the valve 73, and the nitrogen is discharged from the nitrogen discharge line 74 by opening the valve 75. After heating of the formic acid aqueous solution to a temperature of at least 80° C. to remove dissolved oxygen, metal iron is added (step S3), then the metal iron is dissolved in step S4 using a stirrer 77 (step S4), and the stirring operation is continued until no more of the metal iron has been dissolved (step S5). Following completion of the dissolving of the metal iron, after cooling-down of the formic acid aqueous solution to room temperature, the valve 75 on the nitrogen discharge line 74 is closed, an internal pressure of the chemical liquid tank 45 is increased while an indication on a pressure gauge 76 is being monitored, and the valve 73 on the nitrogen supply line 72 is closed to obtain a desired state of pressurization (step S6). Under this state, the chemical liquid tank 45 is disconnected from the nitrogen supply device 71 and the chemical is stored while being pressurized (step S7). The chemical is next transported to its usage place in which the ferrite film-forming apparatus 30 shown in FIG. 5 is present (step S8). Next as shown, the chemical liquid tank 45 is connected to the apparatus 30 (step S9), the nitrogen supply device 71 is reconnected to the nitrogen introduction line 72 (step S9), and the valve 75 is opened to discharge the nitrogen from the nitrogen discharge line 74 (step S10). After this, the valve 80 of the ferrite film-forming chemical introduction port 79 is opened to supply the chemical (processing liquid) to a pipeline provided for introducing the processing liquid into a section on which the ferrite film is to be formed (step S11).

In accordance with the process flow described above, the ferrite film is formed using the film deposition apparatus that is the ferrite film-forming apparatus installed on the recirculation piping system of the nuclear power plant, shown in FIGS. 4, 5. Preferably, chemical decontamination of the section on which the film is to be formed is conducted before the film is formed. The kind of decontamination conducted, however, is not limited to chemical decontamination and may be mechanical decontamination such as polishing. What is important is that, before the ferrite film is formed, the surface of a metallic member on which the ferrite film will be formed should be exposed.

Chemical decontamination is a well-known method, so this method is briefly described below. First after the valves 33, 34, 47, 55, 56, 49, 57 have been opened and other valves closed, the circulating pumps 32, 48 are activated to circulate the processing liquid within the surge tank 31 into the reactor water recirculation system 22 to be subjected to chemical decontamination. After that, the processing liquid is heated to a temperature of about 90° C. by the heater 53. Next, the valve 36 is opened to supply a necessary amount of potassium permanganate from the hopper of the ejector 37 to the surge tank 31. The chemical that has been dissolved in the surge tank 31 is then circulated into the reactor water recirculation system to be subjected to the decontamination, and contaminants such as an oxide film already existing in the recirculation system undergo oxidative dissolving.

After the oxidative dissolving of the above contaminants, oxalic acid is supplied from the above hopper to the surge tank 31 in order to decompose permanganic acid ions left in the processing liquid. After that, oxalic acid is further added from the hopper to the processing liquid in order to conduct reductive dissolving of the contaminants. In addition, in order to conduct pH conditioning of the processing liquid, the valve 38 is opened and the injection pump 39 is started to add hydrazine to the processing liquid. After oxalic acid and hydrazine have been added in this manner, the valve 61 is opened and at the same time, a valve angle of the valve 56 is adjusted. Thus, metal cations that have been dissolved in the processing liquid by passing a part of the processing liquid through the cation exchange resin tower 60 are adsorbed onto the cation exchange resin and removed from the processing liquid.

After the reductive dissolving of the contaminants, in order to decompose the oxalic acid inside the processing liquid, part of the processing liquid is circulated through the decomposing device 64 by adjusting a valve angle of the valve 65 at an inlet port of the decomposing device 64 and a valve angle of the valve 57 which is a bypass valve of the decomposing device 64. At this time, the valve 54 is opened and then the injection pump 44 is activated to supply hydrogen peroxide from the chemical liquid tank 46 to the processing liquid flowing into the decomposing device 64. The decomposing device 64 then decomposes the oxalic acid and hydrazine. The decomposition of the oxalic acid and hydrazine is followed by closing the valve 55 with the heater 53 off, and at the same time, opening the valve 59 of the cooler 58 to pass the processing liquid through the cooler 58 for reduced temperature of the processing liquid in order to remove impurities therefrom. After the temperature of the processing liquid has thus been reduced to a temperature (say, 60° C.) at which the processing liquid can be circulated through the mixed-bed resin tower 62, the valve 61 of the cation resin tower 60 is closed and then the valve 63 of the mixed-bed resin tower 62 is opened to pass the processing liquid therethrough to remove the impurities contained in the processing liquid.

The contaminants including the oxide film on the metallic member in the region to be decontaminated are dissolved and removed by repeating the above successive processing operations from heating to oxidative dissolving, oxidizer decomposition, reductive dissolving, reducing agent decomposition, and clean-up system operation, two to three times.

Completion of the above process of removing the contaminants including the oxide film on the metallic member to be subjected to film forming is followed by switching to the process of producing the ferrite film. First in this process, after final clean-up system operation, water circulation into the filter 51 is started by opening the valve 50 and then closing the valve 49, and at the same time, the heater 53 is activated to adjust the temperature of the processing liquid to a required value. If there is very small residual solid matter in the water, when the ferrite film is produced, the same film will also be formed on the surface of the solid matter and the chemical will be used wastefully. Water circulation into the filter 51 is used to prevent such wasteful use of the chemical. Executing the water circulation into the filter 51 during the decontamination is not appropriate since the solid matter including dissolved radioactivity of a high level is liable to enhance an internal dose rate of the filter too much. Also, water circulation into the mixed-bed resin tower 62 that has been used during clean-up system operation is stopped by opening the valve 56 and then closing the valve 63.

The required temperature mentioned above is of a level at which a fine film structure of a crystal or the like can be formed to such a degree that a radioactive isotope contained in the reactor water during service operation of the pressure vessel will not be easily incorporated into the ferrite film produced. Therefore, a maximum permissible value of the temperature is preferably 200° C. or less, and a minimum permissible value, although it may be room temperature, is preferably 60° C. (or more) at which a production speed of the film stays within a practical range. Temperatures exceeding 100° C. are not preferable, because the processing liquid must be pressurized for suppression of its boiling, and because the resulting call for high pressure-withstanding performance of temporary equipment will lead to increased plant costs. In consideration of these factors, the required temperature, although preferably up to about 100° C., is not limited thereto.

To form the ferrite film, the Fe (II) ions must be adsorbed onto the surface of the section on which the film is formed. However, although the Fe (II) ions in the solution are oxidized into Fe (III) ions in accordance with equation (1), since the Fe (III) ions are of low solubility in comparison with the Fe (II) ions, the Fe (III) ions will be precipitated as an iron hydroxide by a reaction represented by equation (2) below and will not contribute to the formation of the ferrite film. In order to remove the dissolved oxygen in the processing liquid, therefore, bubbling or vacuum deaeration of the inert gas(es) is preferably conducted.

$$Fe^{3+}+3OH^-\rightarrow Fe(OH)_3 \quad (2)$$

After the processing liquid circulated has reached the required temperature, the valve 41 is opened, then the injection pump 43 is activated, and the chemical, containing the Fe (II) ions, that has been prepared by dissolving iron in the formic acid in accordance with the preparation, storage, and transport process flow according to the present embodiment, is added from the chemical liquid tank 45 connected to the film deposition apparatus 30, to the processing liquid. After that, in order to ferritize the Fe (II) ions adsorbed on the surface of the metallic member which is to undergo processing, the valve 42 is opened, then the injection pump 44 is activated, and the hydrogen peroxide solution of the oxidizer, stored within the chemical liquid tank 46, is added to the processing liquid. Finally in order to condition the processing liquid for a 5.5-9.0 pH value which becomes the parameter for the start of the reaction, the valve 38 is opened, the injection pump 39 is activated, and the hydrazine in the chemical liquid tank 40 is further added to the processing liquid. At this time, a pH value of the processing liquid containing the added hydrazine is monitored using a pH meter 66, and an adding rate of the hydrazine is adjusted for the pH value of the processing liquid to range from 5.5 to 9.0. In this way, the processing liquid that causes a production reaction of the ferrite film constructed mainly of magnetite is prepared and the film is formed on the metal surface in the region which is to undergo processing.

Completion of the production of the above ferrite film constructed mainly of magnetite is followed by waste liquid processing. During waste liquid processing, the formic acid is preferably decomposed into carbon dioxide and water, and hydrazine is preferably decomposed into nitrogen and water, by the decomposing device 64 disposed in the decontamination system. This decomposing process allows reduction in a load of the mixed-bed resin tower 62 and reduction in a waste volume of the ion exchange resin. Similarly to the decomposition of the formic acid, during the above decomposition, since part of the processing liquid is caused to flow into the decomposing device 64, the formic acid and hydrazine are decomposed by adjusting a valve angle of the valve 57 which bypasses the decomposing device 64, and a valve angle of the valve 65 of the decomposing device 64, and adding hydrogen peroxide to the processing liquid flowing into the device 64.

The first embodiment provides a method which, while suppressing the occurrence of ion exchange resin waste and radioactive waste, allows the ferrite film constructed mainly of magnetite to be formed on the surface of a metallic section in the region which is to undergo processing; wherein, during suppression of the deposition of a radioactive isotope, that is, radioactive cobalt ions, on the surface of the metallic member during normal vessel pressure service operation, the formed ferrite film constructed mainly of magnetite makes it possible to prepare, store, transport, and use the chemical, without oxidizing Fe (II) ions present in a container.

Using the method of the present embodiment makes it possible to obtain the advantageous effect that the chemical containing the Fe (II) ions needed to form the ferrite film can be conditioned while preventing the production of Fe (III) that inhibits formation control of the ferrite film. The method also makes it possible to reduce radioactive waste.

Second Embodiment

A second embodiment that is another embodiment of the method of preparing, storing, transporting, and using the chemical to form the ferrite film according to the present invention, is a method that allows a supply state of nitrogen to be maintained, in step S6 of the flowchart of the first embodiment in FIG. 6, without closing specific valves, hermetically enclosing the container, or disconnecting the chemical liquid tank from the nitrogen supply device, and the chemical to be stored, transported, and used in that state.

Figure 7:
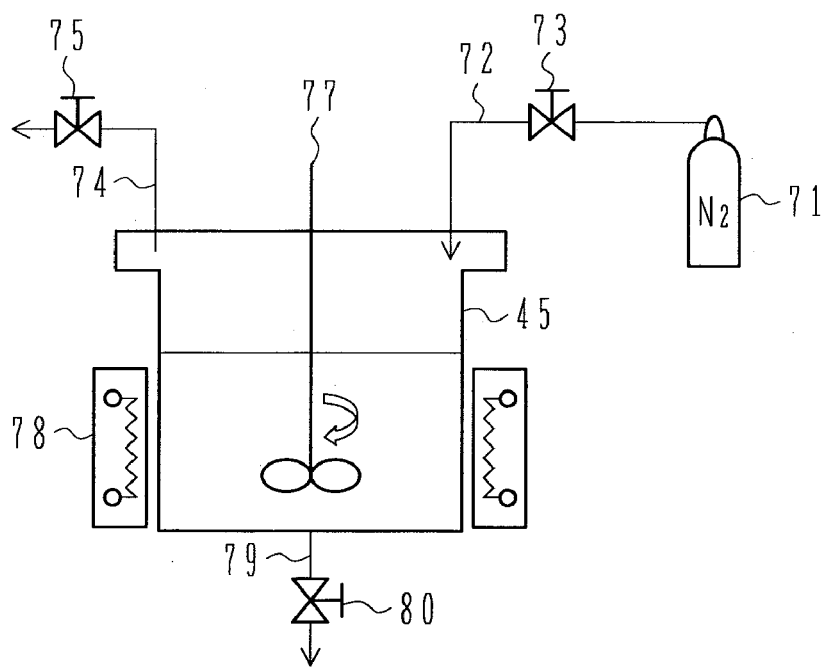
FIG. 7 is a block diagram of a chemical liquid conditioning device and nitrogen supply device used in a second embodiment of the present invention.

FIG. 7 shows a configuration diagram of a chemical liquid conditioning device used in the second embodiment. This chemical liquid conditioning device differs from the chemical liquid conditioning device used in the first embodiment of FIG. 6, in that the pressure gauge 76 is absent. In addition, the chemical liquid conditioning device in FIG. 7 differs in a method of operation. That is to say, whereas the chemical liquid conditioning device in FIG. 6 makes it necessary, after the dissolving of the metal iron, to close the valves 73, 75 and disconnect the nitrogen supply device 71, the chemical liquid conditioning device in FIG. 7 makes it possible to maintain a supply state of nitrogen, even during the storage and transport of the chemical, without closing the valves 73, 75 and without disconnecting the nitrogen supply device 71.

The second embodiment provides a method which, as with the method of the first embodiment, thus allows the chemical to be prepared, stored, transported, and used, without oxidizing Fe (II) ions present in the container.

Third Embodiment

A third embodiment that is yet another embodiment of the method of preparing, storing, transporting, and using the chemical to form the ferrite film according to the present invention, is a method that allows the chemical to be prepared, stored, transported, and used in the state described below. That is to say, first in step S2 of the flowchart of the first embodiment shown in FIG. 1, dissolved oxygen is removed from an aqueous solution in the container by heating the aqueous solution as well as bubbling at least one kind of inert gas therein, and then in step S6 of the flowchart, a heater for heating the aqueous solution is disconnected and at least one kind of inert gas is circulated into the gaseous phase section of the container.

Figure 8A:
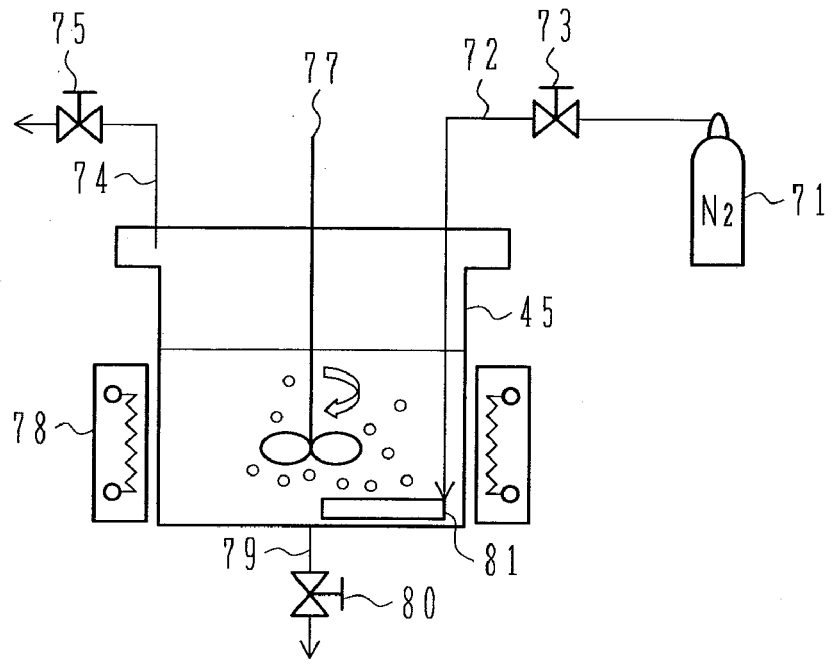
FIGS. 8A, 8B are block diagrams of a chemical liquid conditioning device and nitrogen supply device used in a third first embodiment of the present invention, FIG. 8A also being an explanatory diagram showing a bubbling state with an air diffusion pipe lowered in an aqueous solution, and FIG. 8B also being an explanatory diagram showing a state in which a nitrogen gas is being circulated through a gaseous phase section with the air diffusion pipe raised above the liquid level.
Figure 8B:
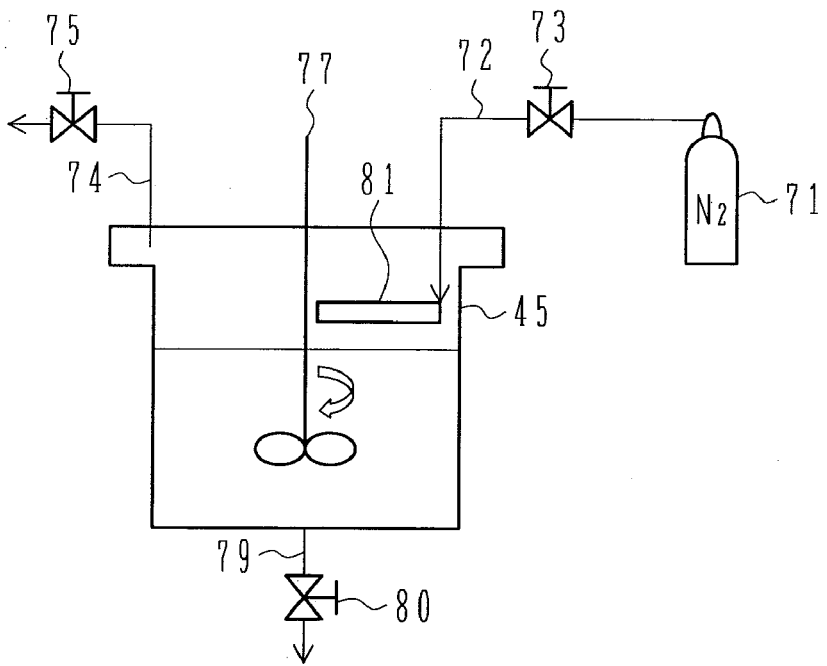

FIGS. 8A and 8B show configuration diagrams of a chemical liquid conditioning device used in the third embodiment. This chemical liquid conditioning device differs from the chemical liquid conditioning device used in the second embodiment of FIG. 7, in that: after the dissolved oxygen in the aqueous solution has been removed by providing a spout port for the nitrogen in the chemical liquid tank 45 and producing very small air bubbles therein through an air diffusion pipe 81, when iron is added and dissolved, bubbling is continued up until this time; and after the iron has been dissolved, the chemical liquid tank 45 is disconnected from the heater 78 and the air diffusion pipe 81 is taken out from the water to the gaseous phase section.

Except in the above respects, the chemical liquid conditioning device in the third embodiment is essentially the same as that of the second embodiment.

In the third embodiment, after the dissolution of the iron, nitrogen is circulated from the air diffusion pipe 81 that has been taken out to the gaseous phase section, and operation enters the phase of storing, transporting, and using the chemical with that state being maintained. During this phase, if bubbling is continued with the air diffusion pipe 81 remaining submerged in the aqueous solution, the moment the air bubbles leave the diffusion pipe 81, a wall surface of the bubbling section will be wetted for a moment with the aqueous solution of the salt which contains Fe (II), and when the bubbles grow once again, drying will occur at the gas-liquid interface and the salt that contains Fe (II) will be enriched. In addition, if this process is repeated, the salt will be enriched to solubility exceeding that of the salt which contains Fe (II), and precipitation of this salt will be started. Progress of the precipitation will cause the precipitated salt to clog the diffusion pipe 81, thus impeding an inflow of the nitrogen, and permitting oxygen to enter from the atmosphere. After the nitrogen has been bubbled in order to remove the dissolved oxygen from the aqueous solution, therefore, the gas is preferably circulated with its spout port taken out to the gaseous phase section following completion of the dissolution of the Fe (II) ions.

The second embodiment provides a method which, as with the method of the second embodiment, thus allows the chemical to be prepared, stored, transported, and used, without oxidizing Fe (II) ions present in the container.

Fourth Embodiment

A fourth embodiment that is a further embodiment of the method of preparing, storing, transporting, and using the chemical to form the ferrite film according to the present invention, provides a method which comprises the steps 1 to 5 in the flowchart of the first embodiment shown in FIG. 1 and step 6 which is different from the first embodiment. In step S6, the method according to the fourth embodiment includes: removing water by reducing internal pressure of the container and distilling the dissolving liquid under the reduced pressure; causing the salt that contains Fe (II) to precipitate in the container; filter-screening and drying the salt while introducing an inert gas so as to prevent the salt from coming into contact with oxygen, and storing the salt in a hermetically enclosed condition; transporting the salt in that state to a usage place; preparing the chemical in the usage place by dissolving the salt in water from which dissolved oxygen has been removed; and supplying the chemical to a pipeline connected to a section on which the ferrite film is to be formed.

Figure 9:
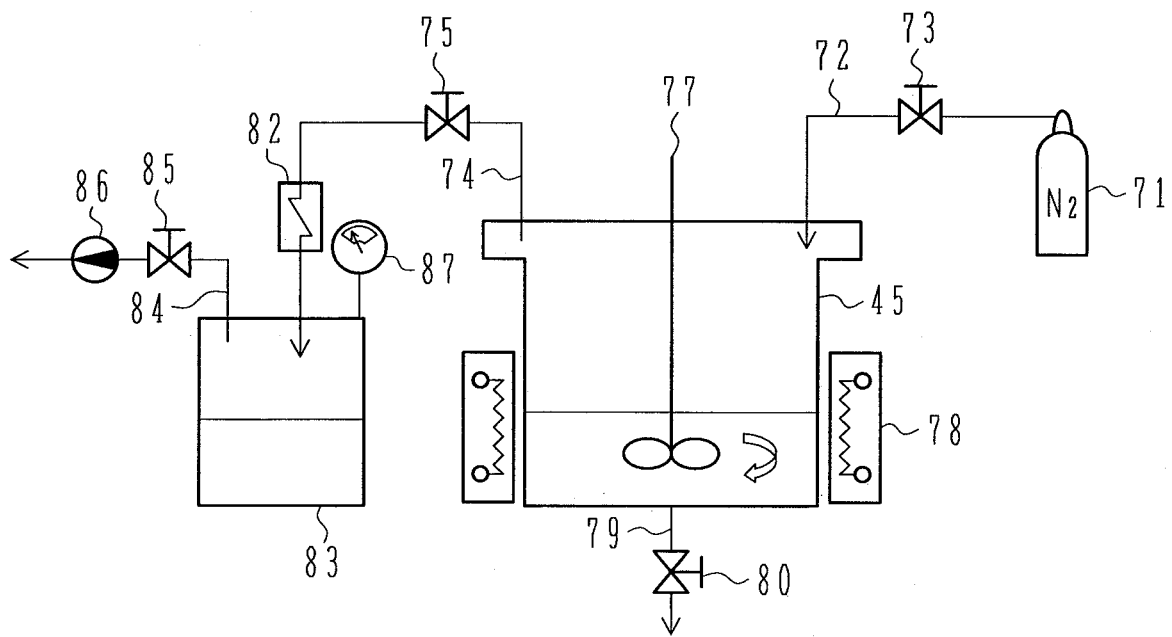
FIG. 9 is a block diagram of a chemical liquid conditioning device for use in a fourth embodiment of the present invention, and a pressure-reducing device connected to the chemical liquid conditioning device.

FIG. 9 shows a chemical liquid conditioning device used in the fourth embodiment. This chemical liquid conditioning device has a major difference from the chemical liquid conditioning device used in the foregoing embodiment, in that a reduced-pressure distilling device is installed at a downstream side of the nitrogen discharge line 74. After iron dissolving, water that is a solvent is removed from an aqueous solution that contains the Fe (II) ions, by conducting the reduced-pressure distilling operation described below. Salt that contains Fe (II) is consequently precipitated. After this, the salt is stored in an inert gas atmosphere into a hermetically enclosed container, then transported in the hermetically enclosed condition, and used in a usage place after being dissolved in water from which dissolved oxygen has been removed.

A method of the distillation under reduced pressure is described below. After iron has been dissolved, a pressure-reducing pump 86 on a pressure reduction line 84 is activated, a valve 85 is opened, and a valve 73 is closed progressively. Next, adjustments are conducted for an indication of about 10-40 kPa on a reduced-pressure gauge 87 of a pressure reduction tank 83, and then while an output of a heater 78 is being adjusted, the water in the aqueous solution that contains Fe (II) ions is evaporated under reduced pressure. The moisture that has been generated during the evaporation is cooled by a cooler 82, returned to a liquid phase, and sent to the pressure reduction tank 83 for storage therein. In this fashion, the aqueous solution containing the Fe (II) ions is gradually enriched inside the chemical liquid tank 45, and finally, the aqueous solution precipitates as a salt that contains Fe (II). If formic acid is used, iron formate (II) precipitates. The Fe (II) salt that has precipitated is dried under a nitrogen airstream, then hermetically enclosed in the nitrogen atmosphere in a container, and stored and transported under that state.

The fourth embodiment, unlike the first embodiment using a chemical liquid tank, does not require using a pressure container, and unlike the second embodiment, does not require using a nitrogen supply device during the storage and transport of the salt. Therefore, the storage and transport of the salt which contains Fe (II) becomes very convenient.

When the above Fe (II) salt is to be used, water is stored into the chemical liquid tank 45 accompanying the film deposition apparatus 30 that forms the ferrite film, and then the dissolved oxygen in the water is removed by bubbling the water under a nitrogen gas atmosphere. After this, the Fe (II) salt that has been prepared as described above, for example, iron formate (II), is added for dissolving, and then the chemical is prepared and used.

The fourth embodiment provides a method which, as with the methods of the first to third embodiments, thus allows the chemical to be prepared, stored, transported, and used, without oxidizing the Fe (II) ions in the container, especially so as to provide convenience in storage and transport.

Fifth Embodiment

Figure 10:
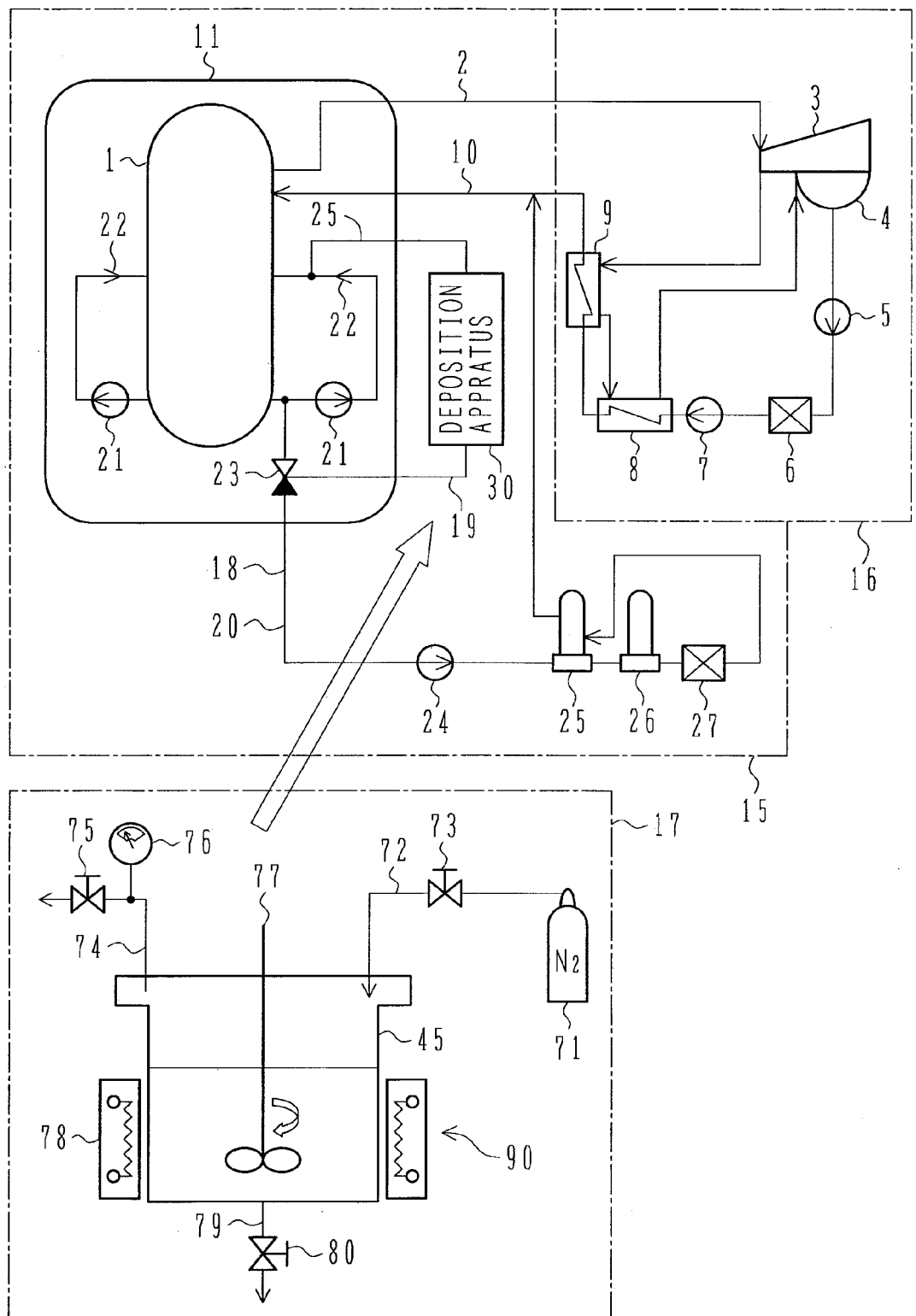
FIG. 10 is an explanatory diagram showing a method of suppressing deposition of a radioactive isotope according to a fifth embodiment which is a further embodiment of the present invention.

Referring to FIG. 10, a method of suppressing deposition of a radioactive isotope is described below as a further embodiment of the present invention. The formation of the ferrite film, based on the radioactive isotope deposition suppression method of the present embodiment, is conducted in, for example, the reactor water recirculation pipeline 22 of a nuclear reactor power plant (e.g., boiling-water-type nuclear reactor power plant) that is subjected to the film deposition. A configuration of this nuclear reactor power plant is already described using FIG. 4 of the first embodiment. Description of the configuration is therefore omitted from the description of the present embodiment. In the present embodiment, the reactor 1, reactor containment vessel 11, reactor water recirculation system, and reactor water clean-up system in the nuclear reactor power plant configuration of FIG. 4 are installed in a reactor building 15 designated as a radiation-controlled area. The other major constituent elements included in the configuration of FIG. 4, namely, the steam turbine 3, the condenser 4, the condensate pump 5 on the supply water pipeline 10, the condensate clean-up device 6, the supply water pump 7, the low-pressure supply water heater 8, and the high-pressure supply water heater 9 are installed in a turbine building 16 designated as the radiation-controlled area. The main steam pipeline 2 and the supply water pipeline 10 are arranged in both the reactor building 15 and the turbine building 16. The above-mentioned nuclear power plant is installed in the radiation-controlled area. A film deposition apparatus (ferrite film-forming apparatus) 30 connected to the reactor water recirculation pipeline 22 similarly to that of the first embodiment has the same configuration as that of the film deposition apparatus used in the first embodiment (see FIG. 5).

After operation of the nuclear power plant has been shut down for its periodic inspection, the radioactive isotope deposition suppression method of the present embodiment is implemented by connecting the film deposition apparatus (ferrite film-forming apparatus) 30 to the reactor water recirculation pipeline 22 similarly to that of the first embodiment. A processing liquid pipeline 35 of the film deposition apparatus 30 is connected to the reactor water recirculation pipeline 22, and a processing liquid pipeline 19 (see FIG. 10) of the film deposition apparatus 30 is connected to a clean-up system pipeline 20 of a reactor water clean-up system 18. More specifically, the processing liquid pipe 19 is connected to a flange that is to have a valve 23, on the clean-up system pipe 20. The reactor water recirculation pipeline 22 is blocked with a plug (not shown) at both ends of the pipeline 22 in order to prevent the reactor water within the reactor pressure vessel from entering the pipeline 22 during ferrite film forming.

The processing liquid pipeline 35 is connected to the surge tank 31 and has valves 34, 33 and a circulating pump 32 arranged in that order on the pipeline, as shown in FIG. 5. The processing liquid pipeline 19 is also connected to the surge tank 31. A valve 47, a circulating pump 48, a heater 53, and valves 55, 56, 49, 57 are arranged in that order on the processing liquid pipeline 19. The clean-up system pipeline 20 of the reactor water clean-up system 18 establishes communication between the reactor water recirculation pipeline 22 and the supply water pipeline 10, and includes a clean-up pump 24, a regenerative heat exchanger 25, a non-regenerative heat exchanger 26, and a reactor water clean-up device 27.

A chemical liquid conditioning device 90 includes a chemical liquid tank 45 communicated with the processing liquid pipeline 35 of the film deposition apparatus 30. The chemical liquid conditioning device 90 has, as shown in FIG. 10, an inert gas introduction line 72 connected to the chemical liquid tank 45, an inert gas discharge line 74, and a chemical liquid introduction port 79. The chemical liquid conditioning device 90 is of the same configuration as that of the chemical liquid conditioning device used in the first embodiment of FIG. 6. The introduction line 72 has a valve 73 and is connected to a nitrogen supply device 71. The discharge line 74 has a valve 75 and a pressure gauge 76. A valve 80 is provided at the introduction port 79.

The process steps flowcharted in FIG. 1 for the first embodiment are also executed in the radioactive isotope deposition suppression method of the present (fifth) embodiment. In the present embodiment, process steps S1-S7 shown in FIG. 1 are executed in a non-radiation-controlled area, for example, a factory 17. Process steps S9-S11 shown in FIG. 1 are executed in the nuclear reactor building 15 designated as the radiation-controlled area. The film deposition apparatus 30 is installed in the nuclear reactor building 15 after the operation of the nuclear power plant has been shut down for periodic inspection or other reasons. After the radioactive isotope deposition suppression method of the present (fifth) embodiment has been executed, the film deposition apparatus 30 is removed from the nuclear reactor building 15.

In the factory 17, the valve 80 is opened, a formic acid aqueous solution is supplied from the introduction port 79 to the chemical liquid tank 45, and the formic acid aqueous solution is heated by a heater 78 (step S1). After this, process steps S2-S5 are executed in that order similarly to those of the first embodiment. When judgment results in step S5 are "Yes", the inside of the chemical liquid tank 45 is pressurized with an inert gas and the tank 45 is hermetically enclosed (step S6). That is to say, the formic acid aqueous solution that contains Fe (II) ions which have been produced from iron dissolving is cooled down to room temperature. After this, the valve 75 on the nitrogen discharge line 74 is closed and while an indication on the pressure gauge 76 is being monitored, nitrogen is supplied from the nitrogen supply device 71 through the introduction line 72 to the chemical liquid tank 45. After the internal pressure of the chemical liquid tank 45 has increased to a previously set pressure, the valve 73 is closed to stop the supply of the nitrogen to the chemical liquid tank 45. The chemical liquid tank 45 is filled with the formic acid aqueous solution (first chemical) that contains the Fe (II) ions, and a space above a liquid level of the aqueous solution in the tank is filled with the pressurized nitrogen. The chemical liquid tank 45 at this time is in a pressurized state and a sealed state.

The chemical liquid tank 45 is stored in its sealed state into the factory 17 (step S7). The storage of the chemical liquid tank 45, that is, the chemical liquid conditioning device 90, is continued, for example, up until just before the processing liquid pipeline 19, 35 of the film deposition apparatus 30 is connected in the nuclear reactor building 15 to the appropriate pipeline (clean-up system pipeline 20 or reactor water recirculation pipeline 22), as discussed above. At this point of time, the chemical liquid tank 45 is not installed in the film deposition apparatus 30. The nitrogen supply device 71 is already removed from the chemical liquid conditioning device 90 under the stored state thereof.

Immediately before the connection of the above piping to the film deposition apparatus 30 is completed, the chemical liquid tank 45 is transported (step S8). The chemical liquid tank 45 is transported by an automobile such as a truck. The chemical liquid conditioning device 90 that includes the chemical liquid tank 45 filled with the formic acid aqueous solution containing the Fe (II) ions, and internally sealed with nitrogen, is mounted on the automobile, transferred to the nuclear power plant site where the power plant is present, and carried into the reactor building 15. In the reactor building 15, the chemical liquid conditioning device 90 is moved to a location where the film deposition apparatus 30 is installed by use of an overhead-traveling crane. When the chemical liquid conditioning device 90 is transferred, the heater 78, the introduction line 72, the discharge line 74, and the introduction port 79 are already installed on the chemical liquid tank 45. The chemical liquid tank 45 itself can also be transported with the nitrogen supply device 71 connected to the introduction line 72.

The transferred chemical liquid tank 45 is installed in the film deposition apparatus (step S9). After the chemical liquid conditioning device 90 has been transferred to the location of the film deposition apparatus 30, the introduction port 79 is connected to the injection pump 43, whereby the chemical liquid tank 45 is connected to the film deposition apparatus 30. In this connection state, when the valve 80, 41 is opened, the formic acid aqueous solution containing the Fe (II) ions is supplied from the chemical liquid tank 45 to the processing liquid pipeline 35. After this, nitrogen that is an inert gas is supplied to the chemical liquid tank 45 (step S10). In the reactor building 15, the nitrogen supply device 71 is connected to the introduction line 72. The valve 73, 75 is opened and nitrogen is supplied from the nitrogen supply device 71 to the chemical liquid tank 45, followed by being discharged from the discharge line 74.

In step S7, not only the nitrogen supply device 71 may be removed from the chemical liquid conditioning device 90, but also may the stirrer 77 and heater 78 be removed from the chemical liquid conditioning device 90. In addition, the chemical liquid tank 45 on which the introduction line 72 with the valve 73, the discharge line 74 with the valve 75, and the introduction port 79 with the valve 80 are installed may be stored. If these operations are actually performed, the chemical liquid tank 45 with introduction line 72, discharge line 74, and introduction port 79, is mounted on the automobile and transferred to the above required place in the radiation-controlled area. The chemical liquid tank 45 is then installed in the film deposition apparatus 30 in step S9.

This renders the film deposition apparatus 30 usable, thus making it possible to form the ferrite film on the inner surface of the reactor water recirculation pipeline (nuclear reactor power plant structural member) 22 that will come into contact with the reactor water. When the valve 80, 41 is opened, the injection pump 43 is driven and the formic acid aqueous solution containing the Fe (II) ions is supplied to the processing liquid pipeline 35 (step S11). Similarly to the first embodiment, since opening the valves 42, 38 drives the injection pumps 44, 39, hydrogen peroxide (second chemical) and hydrazine (third chemical) are supplied from the chemical liquid tanks 46, 40, respectively, to the processing liquid pipeline 35. Since the circulating pump 32 is already driven, the formic acid aqueous solution, hydrogen peroxide, and hydrazine that have been supplied to the processing liquid pipeline 35 are mixed to form a processing liquid, which is then supplied to the reactor water recirculation pipeline 22 to be subjected to ferrite film forming. This processing liquid is passed through the reactor water recirculation pipeline 22, then discharged into the processing liquid pipeline 19, and returned to the surge tank 31. While the ferrite film is being formed, the processing liquid that contains the chemicals supplied from the chemical liquid tanks 45, 46, 40, is supplied to the reactor water recirculation pipeline 22. The formation of the ferrite film in the present embodiment uses the film deposition apparatus 30 and is conducted in essentially the same manner as that of the first embodiment. The present embodiment can also be applied to forming the ferrite film on an inner surface of the clean-up system pipeline 20 in the clean-up system 18.

Although JP-A-2006-38483 does not provide a prior art for the first to fourth embodiments of the present Application, JP-A-2006-38483 provides a prior art for the present embodiment (fifth) embodiment. In paragraph 0047, FIGS. 8A, 8B (or paragraph 0049, FIG. 9) of JP-A-2006-38483, it has been described that nitrogen is bubbled in the metal-dissolving tank for dissolving iron in a formic acid aqueous solution, and in the chemical liquid tank filled with a formic acid aqueous solution which contains Fe (II) ions. The present inventors have found that the other problems described below occur in the prior art mentioned above. The present inventors have devised the present embodiment in order to solve these problems. Dissolving iron in a formic acid aqueous solution generates hydrogen. Accordingly, in the chemical liquid tank 45 connected to the film deposition apparatus 30, that is, in the chemical liquid tank 45 placed in the reactor building 15 designated as the radiation-controlled area, when a formic acid aqueous solution that contains Fe (II) ions is produced by dissolving iron in a formic acid aqueous solution, if the hydrogen generated during the dissolution of the iron leaks into the installation room of the chemical liquid tank 45 in the reactor building 15 (radiation-controlled area) and the hydrogen concentration in that room increases significantly, a fire or an explosion is likely to break out. If a fire or an explosion breaks out in the radiation-controlled area, this will extend the shutdown period of the nuclear reactor power plant and reduce operational availability of the power plant.

In the present embodiment, unlike the example described in JP-A-2006-38483, since iron dissolving in a formic acid aqueous solution is conducted in the chemical liquid tank 45 at the factory 17 which is a non-radiation-controlled area, even if generated hydrogen leaks into an internal building of the factory, this building will be easier to ventilate than any rooms existing in the radiation-controlled area, so safety will be enhanced. In the present embodiment, a formic acid aqueous solution that contains Fe (II) ions is produced in a non-radiation-controlled area by dissolving iron in a formic acid aqueous solution. That is to say, the chemical liquid tank 45 filled with a formic acid aqueous solution which contains Fe (II) ions is carried into the reactor building 15 designated as the radiation-controlled area. In the present embodiment, therefore, hydrogen due to the production of the formic acid aqueous solution which contains Fe (II) ions does not occur in the reactor building 15 designated as the radiation-controlled area. Fire or explosion due to the occurrence of hydrogen in the reactor building 15 cannot break out in the present embodiment. The present embodiment makes it possible to prevent the operational shutdown period of the nuclear reactor power plant during periodic inspection from being unpredictably extended by the occurrence of fire or explosion due to hydrogen. The present embodiment, compared with an example of dissolving iron in a formic acid aqueous solution in the nuclear reactor building, improves the operational availability of the nuclear power plant.

In addition, since a formic acid aqueous solution that contains Fe (II) ions is, as described above, produced in the factory 17 that is a non-radiation-controlled area, the operations required for the production of the aqueous solution improve in efficiency and the production of the aqueous solution can be completed within a shorter time than in the radiation-controlled area.

Furthermore, in the present embodiment, a processing liquid prepared by mixing the formic acid aqueous solution that contains Fe (II) ions, supplied from the chemical liquid tank 45 connected to the film deposition apparatus 30, the hydrogen peroxide from the chemical liquid tank 46 in the film deposition apparatus 30, and the hydrazine from the chemical liquid tank 40, can be used to form the ferrite film on the inner surface of the nuclear power plant's reactor water recirculation pipeline 22 that is brought into contact with the cooling water. Thus, the deposition of a radioactive isotope on the inner surface of the reactor water recirculation pipeline 22 can be suppressed.

In the present embodiment, as in the first embodiment, since nitrogen is supplied as an inert gas to the chemical liquid tank 45 during the production of an Fe (II) formic acid aqueous solution that requires a relatively long time, Fe (II)—oxygen contact during the production of the aqueous solution can be avoided. This prevents the oxidation of Fe (II) in the chemical liquid tank 45. Accordingly, the quantity of Fe (II) ions adsorbed onto the inner surface of the reactor water recirculation pipeline 22 that is going to be subjected to ferrite film forming will increase when the chemical liquid tank 45 is installed in the film deposition apparatus 30 and the formic acid aqueous solution containing the Fe (II) ions is supplied to the processing liquid pipeline 35. The increase in the quantity of Fe (II) ions causes a production reaction of the ferrite film to occur more easily, and makes shorter the time required for the formation of the ferrite film. In the present embodiment, since the space above the liquid level in the chemical liquid tank 45 is filled with nitrogen during the storage and transport of the chemical liquid 45 filled with the formic acid aqueous solution that contains the Fe (II) ions, the Fe (II) ions in the chemical liquid tank 45 can be prevented from coming into contact with oxygen and becoming oxidized. This also makes it possible to increase the quantity of Fe (II) ions adsorbed onto the inner surface of the reactor water recirculation pipeline 22.

Advantageous affects similar to or equivalent to those of the present embodiment can be obtained by using, instead of the chemical liquid conditioning device 90, either chemical liquid conditioning device shown in FIGS. 7, 8, 9.

In the embodiment of FIG. 10, the production of the formic acid aqueous solution containing the Fe (II) ions, inside the chemical liquid tank 45, is conducted in the factory 17 that is a non-radiation-controlled area. The production of this formic acid aqueous solution may be conducted in a non-radiation-controlled area at the power plant site having the nuclear power plant. The non-radiation-controlled area at the power plant site where the nuclear power plant is present is an area present outside the radiation-controlled area including, for example, the reactor building 15 and turbine building 16 at that site. For production of the above aqueous solution in the non-radiation-controlled area, the chemical liquid conditioning device 90 is mounted on a load-carrying platform of a truck and carried into the non-radiation-controlled area at the power plant site. In this case, the production of the formic acid aqueous solution containing the Fe (II) ions, inside the chemical liquid tank 45, is conducted with the chemical liquid conditioning device 90 mounted on the load-carrying platform of the truck. After that, as described above, immediately before the film deposition apparatus 30 is connected to the reactor water recirculation pipeline 22, the chemical liquid conditioning device 90 is transferred to the reactor building 15 and the chemical liquid tank 45 is installed in the film deposition apparatus 30. The formic acid aqueous solution containing the Fe (II) ions is supplied from the chemical liquid tank 45 to the reactor water recirculation pipeline 22.

Sixth Embodiment

Figure 11:
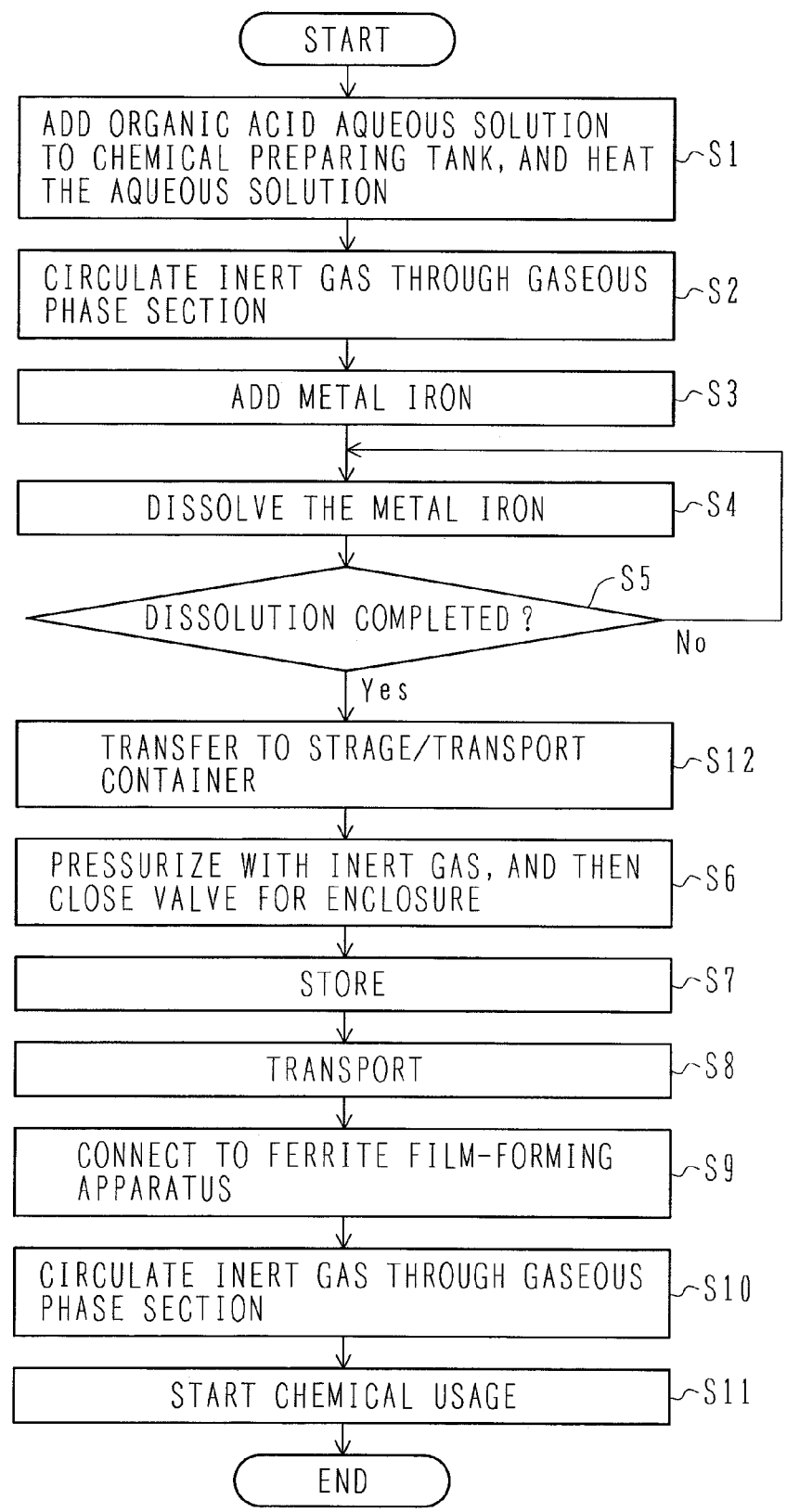
FIG. 11 is a flowchart showing a procedure for implementing a method of suppressing deposition of a radioactive isotope according to a sixth embodiment which is a further embodiment of the present invention.
Figure 12:
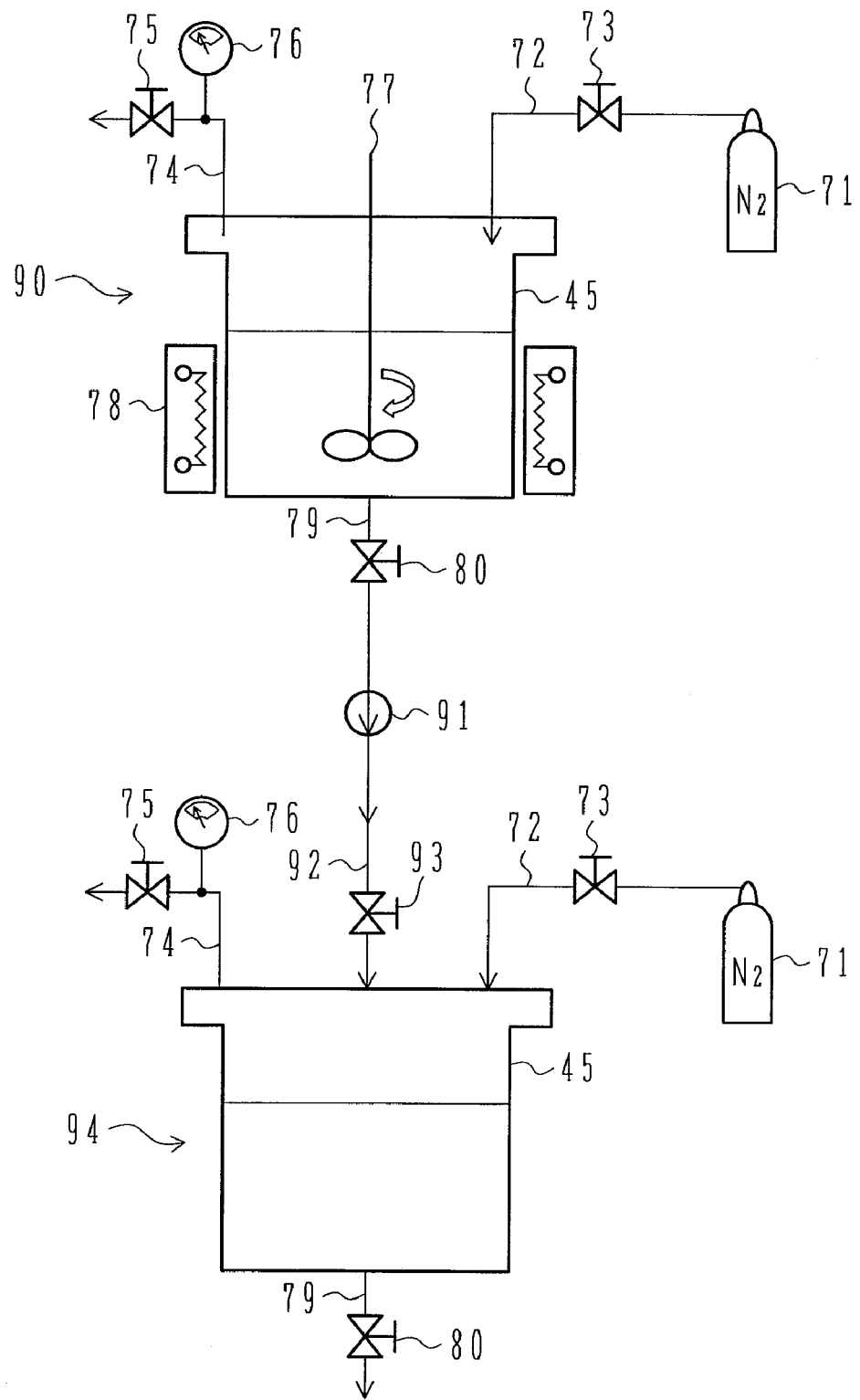
FIG. 12 is an explanatory diagram that shows transfer of a formic acid aqueous solution to a transport container in step S12 of the sixth embodiment.

Referring to FIGS. 10, 11, 12, a method of suppressing deposition of a radioactive isotope is described below as a further embodiment of the present invention. The formation of the ferrite film, based on the radioactive isotope deposition suppression method of the present embodiment, is also conducted in, for example, the reactor water recirculation pipeline 22 of the nuclear reactor power plant (e.g., boiling-water-type nuclear reactor power plant). The process steps shown in FIG. 11 are executed in the radioactive isotope deposition suppression method of the present embodiment. In the process flow of FIG. 11, step S12 is inserted between steps S5 and S6 executed in the fifth embodiment in accordance with the process flow of FIG. 1.

In the sixth embodiment, steps S1-S7 are also executed in the factory 17 that is a non-radiation-controlled area. In addition, step S12 is executed in the factory 17. Step 12 is described in detail below. In step S12, the formic acid aqueous solution that contains Fe (II) ions, stored within the chemical liquid tank 45 of the chemical liquid conditioning device 90, is transferred to a chemical liquid tank 45 of a transport container 94. The transport container 94 has a configuration with the stirrer 77 and heater 78 removed from the chemical liquid conditioning device 90. That is to say, the transport container 94 includes the chemical liquid tank 45 to which are connected an introduction line 72 with a valve 73, a discharge line 74 with a valve 75, and an introduction port 79 with a valve 80. A pressure gauge 76 is also provided on an associated discharge line 74. A solution transfer pipe 92 is connected to the valve 80 of the chemical liquid conditioning device 90. The solution transfer pipe 92 has a transfer pump 91 at one end of the pipe. The solution transfer pipe 92 is connected at the other end to a valve 93 on the chemical liquid tank 45 of the transport container 94. The valves 73, 80 of the transport container are closed. When the transfer pump 91 is driven by opening the valves 80 and 93 of the chemical liquid conditioning device 90, the formic acid aqueous solution that contains Fe (II) ions, stored within the chemical liquid tank 45 of the chemical liquid conditioning device 90, is passed through the solution transfer pipe 92 and supplied to the chemical liquid tank 45 of the transport container 94. After the transport of this formic acid aqueous solution to the latter chemical liquid tank 45 has been completed, the valves 80, 93 of the chemical liquid conditioning device 90 are closed once again. The solution transfer pipe 92 is then removed from the valve 93.

After the operations in step S12, steps S6, S7 are executed in the factory 17 similarly to the fifth embodiment. In step S8, the transport container 94 is mounted on an automobile, then temporarily carried to a position near the reactor building 15 in the nuclear reactor power plant, and further transferred to the reactor building 15 as the radiation-controlled area. In step S9, the chemical liquid tank 45 of the transport container 94 which has been transferred to a film deposition apparatus 30 placed at a required position in the reactor building 15 is connected to an injection pump 43 of the film deposition apparatus 30 in a manner similar to that of the fifth embodiment. After that, as in the fifth embodiment, the ferrite film is formed using the formic acid aqueous solution that contains Fe (II) ions, stored within the chemical liquid tank 45.

In the present embodiment, the advantageous effects yielded in the fifth embodiment can also be obtained. In the present embodiment, since the formic acid aqueous solution that contains Fe (II) ions is transferred to the required position in the reactor building 15 by using the transport container 94, weight is light, and the transfer is easy, compared with the transfer of the chemical liquid conditioning device 90.

The fifth and sixth embodiments can also be applied to forming the ferrite film on the surfaces of structural members (e.g., system pipe inner surfaces) of a pressurized-water reactor power plant, as well as of a boiling-water reactor power plant, that come into contact with a coolant.

What is claimed is:

1. A method of suppressing deposition of a radioactive isotope on a structural member in contact with water coolant of a nuclear power plant, the method comprising the steps of:

providing a chemical liquid conditioning device and locating the chemical liquid conditioning device in a non-radiation controlled area;

providing a first chemical liquid tank in the chemical liquid conditioning device;

adding an organic acid aqueous solution to the first chemical liquid tank;

heating the organic acid aqueous solution in the first chemical liquid tank;

circulating an inert gas through a gaseous phase section of the first chemical liquid tank;

adding metal iron to the organic acid aqueous solution in the first chemical liquid tank;

dissolving the metal iron in the organic acid aqueous solution in the first chemical liquid tank;

ascertaining that the metal iron has been dissolved in the organic acid aqueous solution in the first chemical liquid tank;

cooling the organic acid aqueous solution containing the dissolved metal iron;

pressurizing the first chemical liquid tank with the inert gas;

providing a transport container including a second chemical liquid tank;

transferring the organic acid aqueous solution from the first chemical liquid tank to the second chemical liquid tank;

pressurizing the second chemical liquid tank with the inert gas;

storing the organic acid aqueous solution as a first chemical in the second chemical liquid tank;

transporting the second chemical liquid tank filled with the first chemical which contains ferrous (II) ions from the non-radiation-controlled area into a radiation-controlled area in which a nuclear reactor of the nuclear power plant is installed;

providing a film deposition apparatus in the radiation-controlled area;

connecting the second chemical liquid tank as a first chemical container filled with the first chemical to the film deposition apparatus which further includes a second chemical container containing a second chemical for oxidizing the ferrous (II) ions into ferric (III) ions, and a third chemical container containing a third chemical for pH-adjusting and forming a processing liquid containing the first chemical, the second chemical and the third chemical;

bringing the processing liquid that contains the first, second, and third chemicals in a mixed form, into contact with a surface of the structural member of the nuclear power plant with which surface the water coolant of the nuclear power plant comes into contact; and forming a ferrite film on the surface of the structural member contacted by the processing liquid.

2. The method of suppressing deposition of a radioactive isotope according to claim 1, further including providing the structural member as an inner surface of a pipeline of a system provided in the nuclear power plant, the system having the water coolant flowing inside; and supplying the processing liquid to an interior of the pipeline.

3. The method of suppressing deposition of a radioactive isotope according to claim 1, further including pressurizing the second chemical liquid tank to be transported into the radiation-controlled area with an inert gas in a space in the second chemical liquid tank above a liquid level of the first chemical.

4. The method of suppressing deposition of a radioactive isotope according to claim 1, further including providing a carboxylic acid in the first chemical liquid tank and using the carboxylic acid for producing the ferrous (II) ions.

5. The method of suppressing deposition of a radioactive isotope according to claim 1, further including providing the organic acid aqueous solution as an aqueous solution of carboxylic acid.

6. The method of suppressing deposition of a radioactive isotope according to claim 5, further including providing the carboxylic acid as formic acid.

7. The method of suppressing deposition of a radioactive isotope according to claim 4, further including providing the carboxylic acid as formic acid.

* * * * *